United States Patent [19]
Takada

[11] 4,266,811
[45] May 12, 1981

[54] PASSIVE VEHICLE PASSENGER RESTRAINT BELT SYSTEM

[76] Inventor: Juichiro Takada, 3-12-1, Shinmachi, Setagayaku, Tokyo, Japan

[21] Appl. No.: 2,245

[22] Filed: Jan. 10, 1979

[30] Foreign Application Priority Data

Mar. 9, 1978 [JP] Japan .......................... 53/029075[U]

[51] Int. Cl.³ .............................................. B60R 21/10
[52] U.S. Cl. .................................................... 280/803
[58] Field of Search .............................. 280/803, 804; 297/385–389

[56] References Cited

U.S. PATENT DOCUMENTS

| | | | |
|---|---|---|---|
| 3,754,776 | 8/1973 | Cataldo et al. | 280/803 |
| 3,882,955 | 5/1975 | Kaneko et al. | 280/804 |
| 3,917,019 | 11/1975 | Pearson et al. | 280/803 |
| 4,138,142 | 2/1979 | Wize | 280/803 |

*Primary Examiner*—Robert R. Song
*Attorney, Agent, or Firm*—Brumbaugh, Graves, Donohue & Raymond

[57] ABSTRACT

A passive seat belt system for use in a vehicle with a seat belt displacing device, in which the seat belt can be fully displaced to passenger releasing position in response to only partial opening of the vehicle door.

5 Claims, 4 Drawing Figures

PASSIVE VEHICLE PASSENGER RESTRAINT BELT SYSTEM

FIELD OF THE INVENTION

This invention relates to a passive vehicle passenger restraint belt system which automatically effects the restraint and release of a passenger in response to the closing and opening of the vehicle door.

BACKGROUND OF THE INVENTION

A passive restraint belt system automatically transfers a shoulder belt, a lap belt, or both, from a restraining position to a releasing position and vice versa in response to the opening or closing of the vehicle door and makes it easier for a passenger to get into and out of the vehicle. Installation of passive restraint systems will soon become legally obligatory, and several types have already been proposed and studied.

The inventor of the present invention has made extensive studies and put forward several proposals for passive restraint systems, such as a transfer mechanism for the shoulder belt, the lap belt, or both (U.S. patent appln. Ser. No. 950,020, filed Oct. 10, 1978). From the points of view of reliability, practicality, cost of production and so forth, however, there is room for further improvement to arrive at a system for commercialization that will fulfill all requirements. Therefore, further development is continuing.

SUMMARY OF THE INVENTION

The present invention is an improvement in a passive restraint belt system having a shoulder belt and a lap belt and is directed specifically to making it easier for the passenger to enter and leave a vehicle by rapidly transferring a lap belt upon partial opening or closing motions of a door.

More particularly, a passive vehicle passenger restraint belt system, according to the present invention, comprises a shoulder belt extending up from an emergency locking retractor affixed at a suitable location on the rear portion of the vehicle door to and freely through an anchor ring mounted on the upper rear portion of the door and thence downwardly and generally transversely from the anchor ring to a point of connection at generally the center of the vehicle behind, inboard of and below a passenger position on the vehicle seat. A lap belt extends from an emergency locking retractor affixed on the lower rear portion of the door to and through a movable transfer guide ring on the door, passes from the transfer guide ring generally transversely across the vehicle to a point of connection at generally the center of the vehicle behind, inboard of and below a passenger position on the seat. The transfer guide ring is fastened to a transfer wire having a section which is guided substantially vertically along the rear portion of the door from a lower location adjacent the lap belt retractor to an upper location partway up the door. The transfer wire is driven automatically to move the transfer guide ring between the lower and upper locations in response to movements of the vehicle door between closed and partly open positions, but no substantial movement is imparted to the transfer wire when the door is moved between the partly open and fully open positions. The drive and transfer devices associated with the lap belt thus rapidly move the belt to the passenger-releasing position when the door is only partly opened, thus making it much easier for the passenger to get into and out of the vehicle, particularly when the vehicle is along side an obstruction which prevents the door from being fully opened. Moreover, the passenger can more easily begin to get out of the vehicle as the door is being opened, inasmuch as the lap belt is fully transferred to the releasing position, upon only partial opening of the door.

In a preferred embodiment of the invention the shoulder belt and lap belt are portions of a single continuous belt. The belt either passes freely through or is fastened to a ring which can be attached to and detached from a buckle affixed to the vehicle inboard of the passenger position, the buckle and ring constituting a common point of connection for both belt portions.

The drive for the transfer wire and transfer guide is preferably a mechanical motion amplifier. A linkage is connected at one end to the vehicle body adjacent the front of the door and has a rack gear at the other end. An input pinion meshes with and is driven by the rack gear, and at least one amplifier gear pair is driven by the input pinion and is coupled to and drives an output pulley which, in turn, is connected to and drives the transfer wire.

For a better understanding of the invention and a description of further features and advantages thereof, reference may be made to the following description of an exemplary embodiment, taken in conjunction with the figures of the accompanying drawings.

DESCRIPTION OF EXEMPLARY EMBODIMENTS

Figure 1:
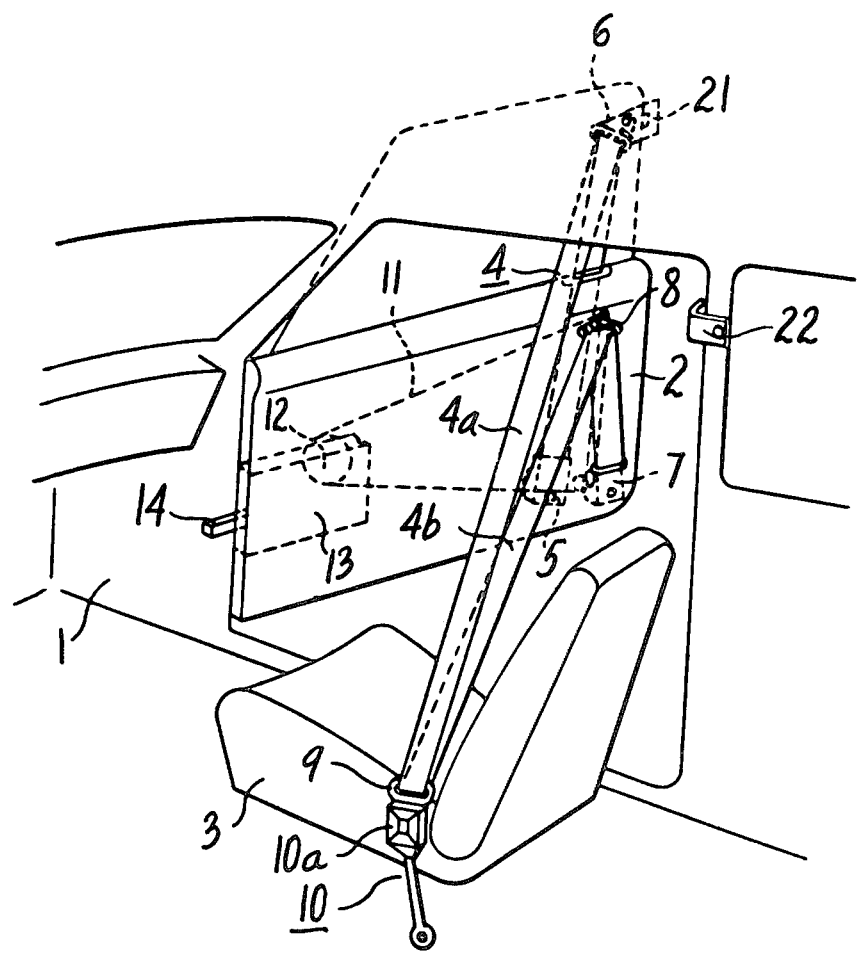
FIG. 1 is a pictorial view in generally schematic form of the embodiment, the view showing the restraint system in the passenger-releasing position with the door open.

The embodiment is constructed for use in the front seat 3 of a vehicle 1 having a door 2 which is hinged along its front edge to the vehicle body to swing out and allow entry and departure of passengers. The restraint system comprises a continuous belt 4, a portion 4a of which constitutes a shoulder belt and a portion 4b of which constitutes a lap belt. The outboard end of the shoulder belt portion 4a is wound onto a retractor 5 which is installed at a suitable location on the door, preferably, as shown, in the space between the inner and outer door panels. The belt leads up from the retractor 5 to and freely through an anchor 6 which is attached at the upper rear corner of the door and then turns downwardly and leads transversely toward the center of the vehicle where it passes through a slot in a tongue 9 which can be inserted into and released from a buckle 10a supported by a bracket 10 anchored to the car floor. A lap belt portion 4b of the belt 4 passes back across the seat and to and freely through a transfer guide 8 mounted along the rear edge of the door for vertical movement, as described in more detail below. The lap belt portion 4b leads from the transfer guide to a retractor 7 installed on the door 2 adjacent the lower rear corner.

Rather than having the belt 4 lead freely through a slot in the tongue 9, it is equally acceptable for the two belt sections 4a and 4b to be sewn together adjacent the tongue 9. Regardless of whether the belt is affixed to the tongue 9 or is free to be pulled through the tongue 9, it is desirable that the winding force of the lap belt retractor 7 be considerably greater than that of the shoulder belt retractor 5. It is also preferable that each of the retractors be of the type which is inactive whenever the door is open and is activated when the door is closed, thus to permit the belt to be freely withdrawn at any speed without any tendency to lock when the door is moved open rapidly. Such selectively inactivated emergency locking retractors are known per se, and need not be described here. The use of selectively activated emergency locking retractors permits the retractor to be designed to lock very quickly and thus permits the belt 4 to have a relatively large percent elongation when tested in accordance with standard test methods in conjunction with the particular type of retractor. An elongation of up to about 6% is acceptable.

Figure 3:
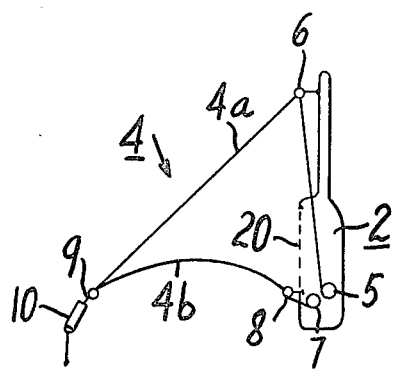
FIG. 3 is a schematic drawing showing the restraint system in the passenger-restraining position.
Figure 4:
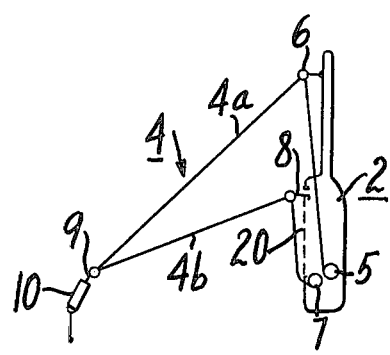
FIG. 4 is a schematic drawing of the system in the passenger-releasing configuration.

The transfer guide 8 is movable along a path adjacent the rear edge of the door which is oriented substantially vertically and is driven between a lower, passenger-restraining position (see FIG. 3) and an upper, passenger-releasing position (see FIG. 4) by a transfer wire 11. The transfer wire is driven by an output reel associated with a mechanical motion amplifier 13. In particular, the transfer guide 8 is fixed to a portion of the wire which moves along the vertical path adjacent the rear edge of the door between turning rolls or similar elements mounted near the ends of a track 20 installed in the door. The construction and mode of operation of a suitable mechanical motion amplifier 13 is described and shown in detail in U.S. patent application Ser. No. 950,020 filed Oct. 10, 1978, owned by the assignee of the present invention. Reference may be made to that application for a full understanding of the mechanism.

Figure 2:
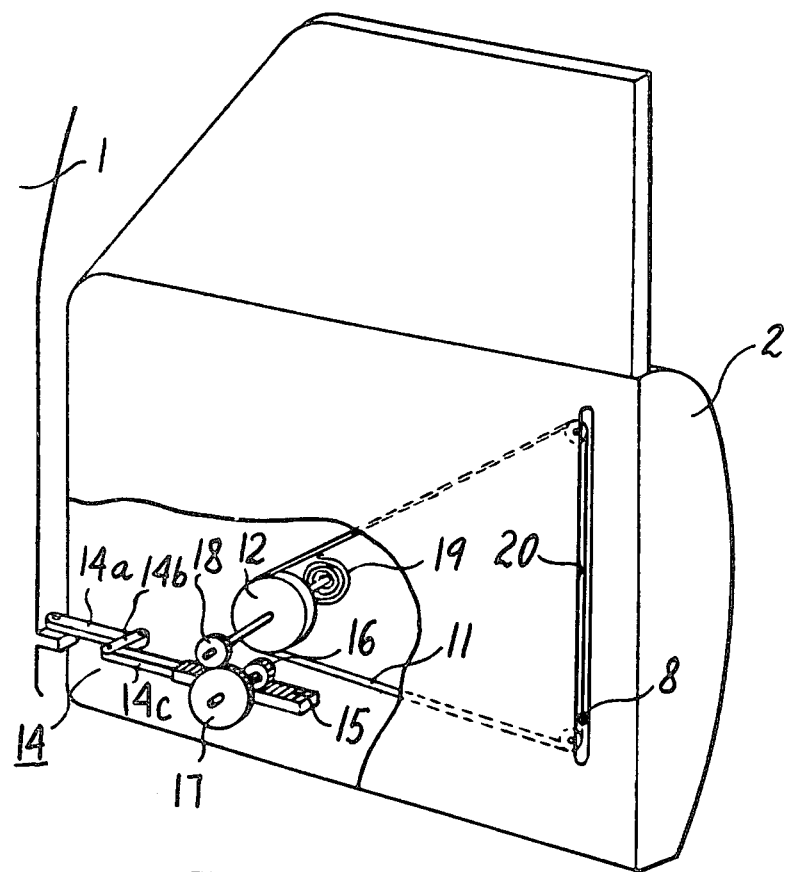
FIG. 2 is a pictorial view in generally schematic form of the transfer drive and transfer wire system for moving the lap belt.

Briefly, the transfer mechanism (see FIG. 2) includes a folding linkage 14 which comprises a first link 14a that is connected to the vehicle body 1 adjacent to the front edge of the door at a location transversely inwardly of the axis of the door hinges. The other end of the link 14a is connected to an intermediate link 14b for articulation. A link 14c is connected to the other end of the intermediate link 14b and has a gear rack 15 extending along its free end portion. A pinion 16 meshes with and is driven by the gear rack 15 and drives a large gear 17 which, in turn, meshes with and drives a second pinion 18 that drives the reel 12 (which is mounted on the same shaft as the pinion 18). A spiral spring biases the mechanism in a direction which will move the transfer guide 8 from the lower to the upper position in the track 20, thereby reducing the force required to open the door and drive the guide against the resisting force of the lap belt retractor. When the door is closed, the spring stores energy which is released when the door is opened.

The linkage 14 is controlled by a control member (not shown) which holds the linkage in a folded condition with the intermediate link 14b generally overlapping and oriented generally parallel to the adjacent end portions of the links 14a and 14c during movement of the door between a fully closed and partly opened position, say approximately one-half way between the closed and fully opened positions. When the linkage 14 is thus controlled and retained in the folded condition, movement of the door 2 relative to the vehicle body 1 as the door swings out causes the gear train to move relative to the gear rack 15, thus driving the pinion 16 in rotation. The rotation of the pinion 16 is multiplied through the gears 17, 18 and the reel 12 to provide for movement of the transfer guide 8 from the lower position to the upper position in the track 20. As mentioned above, the spring 19 assists in moving the transfer guide up the track 20. When the transfer guide 8 has reached the upper position in the track, the control device associated with the linkage 14 substantially stops the movement of the link 14c relative to the gear train while affording articulation of the linkage into a generally unfolded condition shown in FIG. 2 in which articulation occurs between the intermediate link 14b and the other two links 14a and 14c. Opening and closing motions of the door between the partway open position where motion of the rack gear 15 relative to the door stops and the fully open position takes place without any movement of the transfer guide 8. When the door is returned to the fully closed position, the linkage and amplifier mechanism drives the transfer wire 11 in the opposite direction and moves the guide back to the lower position in the track 20.

Thus, the invention provides for moving of the lap belt 4b from the passenger-restraining position (FIG. 3) to the passenger-releasing position (FIG. 4) automatically in response to movement of the door from the closed position to a partway open position, thus releasing the passenger and allowing him to leave the vehicle with ease. Meanwhile, the shoulder belt 4a is moved from the restraining position to the releasing position by virtue of the outward and forward movement of the upper rear corner of the door when the door is opened. The retractors 5 and 7 automatically pay out and roll in sufficient lengths of the belt to accommodate opening and closing movements of the door. As mentioned previously, it is preferable that those retractors be of a type that is inactive during opening and closing movements and be activated and function as emergency locking retractors when the door is closed.

A further desirable provision in the system shown in the drawings is a strong hook 21 mounted on the upper rear corner of the door and a mating bracket 22 on the door pillar. Other desirable, though optional, features of the system include a suitable protective covering (not shown) over the opening of the track 20 to protect and conceal the slot of the track while permitting the guide 8 to move up and down in operation. A suitable protective and concealing arrangement is described and shown in U.S. patent application Ser. No. 950,020, filed Oct. 10, 1978 owned by the assignee of the present invention.

It will be readily apparent to those skilled in the art that the multiplier factor of the amplifier mechanism 13 can be selected to accommodate the desired extent of movement of the transfer guide 8 vertically along the door for a given degree of opening of the door.

Thus, there is provided, in accordance with the present invention, a seat belt system in which the lap belt moves rapidly and smoothly from a passenger-restraining position to a passenger-releasing position automatically upon the partial opening of the door and is restored, also automatically, to the restraining-position when the door is reclosed. Similarly, the shoulder belt releases the occupant when the door is opened and automatically restrains the occupant when the door is reclosed. The amplifier mechanism provides such movements of the lap belt reliably and effectively by a mechanical action which does not require the use of motors or relatively expensive wiring and control devices.

The above-described embodiment is intended to be merely exemplary, and numerous variations and modifications thereof will be readily apparent to those skilled in the art without departing from the spirit and scope of the invention. All such variations and modifications are intended to be included within the scope of the invention as defined in the appended claims.

I claim:

1. In a passive vehicle passenger restraint belt system which includes a shoulder belt extending up from an emergency locking retractor affixed on the rear portion of the vehicle door to and freely through an anchor ring mounted on the upper rear portion of the door and extending downwardly and transversely in from the anchor ring to a point of connection at generally the center of the vehicle behind, inboard of and below a passenger-position on the vehicle seat, and a lap belt extending from an emergency locking retractor affixed on the lower rear portion of the door to and freely through a movable transfer guide ring on the door and from the transfer guide ring generally transversely across the vehicle to a point of connection in generally the center of the vehicle behind, inboard of, and below a passenger-position on the seat, the improvement comprising a lap belt transfer wire having a section guided substantially vertically along the rear portion of the door from a lower location adjacent the lap belt retractor to an upper location partway up the door, the transfer guide ring being fastened to said section of the transfer wire, and means for automatically driving the transfer wire to move the transfer guide ring between said lower and upper locations in response to movements of the vehicle door between closed and partly open positions, respectively, said driving means being a mechanical motion amplifier which includes a linkage connected at one end to the vehicle body adjacent the front of the door and having a rack gear at the other end, an input pinion meshing with and driven by the rack gear, at least one amplifier gear pair driven by the input pinion and coupled to and driving an output pulley which is, in turn, connected to and drives the transfer wire, and said driving means being ineffective to move the transfer wire when the door is moved between the partly open and fully open positions.

2. A seat belt system according to claim 1 wherein the shoulder belt and lap belt are portions of a continuous belt, and further comprising a buckle and a ring through which the continuous belt freely passes and which is adapted to be attached to and detached from the buckle, the buckle and ring constituting a common point of connection for both belt portions.

3. A seat belt system according to claim 1 and further comprising a buckle secured to the vehicle inboard of the passenger-position on the seat and a ring which is adapted to be attached to and detached from the buckle, the buckle and ring constituting a common point of connection for both the shoulder and lap belts and both belts terminating at and being secured to the ring.

4. A seat belt system according to claim 1, 2 or 3 wherein the lap belt retractor has a winding force that is substantially greater than the winding force of the shoulder belt retractor.

5. A seat belt system according to claim 1, 2 or 3 wherein both retractors are of a type which is non-locking when the door is open and is emergency-locking when the door is closed.

* * * * *